(12) United States Patent
Lapis et al.

(10) Patent No.: US 12,722,695 B2
(45) Date of Patent: Sep. 1, 2026

(54) FRONT AND REAR STEERING VEHICLE WITH YAW AND SLIP CONTROL

(71) Applicants: thyssenkrupp Presta AG, Eschen (LI); thyssenkrupp AG, Essen (DE)

(72) Inventors: Leonard Lapis, Sennwald (CH); Carlo Mario Miano, Triesenberg (LI); Kristof Polmans, Tarrenz (AT); Alexander Scheidt, Au (CH)

(73) Assignees: thyssenkrupp Presta AG, Eschen (LI); thyssenkrupp AG, Essen (DE)

( * ) Notice: Subject to any disclaimer, the term of this patent is extended or adjusted under 35 U.S.C. 154(b) by 50 days.

(21) Appl. No.: 18/654,616

(22) Filed: May 3, 2024

(65) Prior Publication Data

US 2024/0367716 A1 Nov. 7, 2024

(30) Foreign Application Priority Data

May 4, 2023 (BE) .................................. 2023/5357

(51) Int. Cl.
*B62D 6/00* (2006.01)
*B62D 15/02* (2006.01)

(52) U.S. Cl.
CPC ........... *B62D 6/003* (2013.01); *B62D 15/021* (2013.01)

(58) Field of Classification Search
CPC ....... B62D 6/003; B62D 7/159; B62D 15/021
See application file for complete search history.

(56) References Cited

U.S. PATENT DOCUMENTS

| | | | |
|---|---|---|---|
| 5,576,957 A | 11/1996 | Asanuma et al. | |
| 5,642,281 A | 6/1997 | Ishida et al. | |
| 7,143,864 B2 * | 12/2006 | Mattson | B60T 8/1755 701/42 |
| 8,116,942 B2 * | 2/2012 | Yasui | B62D 6/003 701/91 |
| 10,407,035 B1 * | 9/2019 | Gadda | B60W 10/20 |
| 2004/0015284 A1 | 1/2004 | Suissa | |
| 2013/0253770 A1 | 9/2013 | Nishikawa et al. | |
| 2015/0336607 A1 | 11/2015 | Inoue | |
| 2018/0201242 A1 | 7/2018 | Bretzigheimer et al. | |
| 2019/0217854 A1 | 7/2019 | Park | |

FOREIGN PATENT DOCUMENTS

| | | |
|---|---|---|
| DE | 195 07 319 A1 | 9/1995 |
| DE | 10039782 A1 | 2/2002 |
| DE | 10360404 A1 | 7/2005 |
| DE | 10 2013 218 919 A1 | 3/2015 |
| DE | 102016217465 A1 | 3/2017 |
| EP | 2576298 A1 | 4/2013 |

* cited by examiner

*Primary Examiner* — Gonzalo Laguarda
(74) *Attorney, Agent, or Firm* — thyssenkrupp North America, LLC

(57) ABSTRACT

A motor vehicle and method for operating the same comprises two front wheels with front wheel steering, two rear wheels with rear wheel steering, and a driving stability device with a controller. The driving stability device, in particular the controller, is designed to synchronize the front wheel steering and the rear wheel steering such that the front wheel steering and rear wheel steering are involved independently of one another in controlling the driving stability.

12 Claims, 3 Drawing Sheets

FRONT AND REAR STEERING VEHICLE WITH YAW AND SLIP CONTROL

CROSS REFERENCE TO RELATED APPLICATION

This application is a U.S. Non-Provisional that claims priority to Belgian Patent Application No. BE 2023/5357, filed May 4, 2023, the entire content of which is incorporated herein by reference.

FIELD

The present disclosure relates to a vehicle, in particular a motor vehicle, having a driving stability device, and to a method for controlling the stability of a vehicle using an adjustable steering column.

BACKGROUND

EP2576298B1 discloses, by way of example, a vehicle comprising at least two forwardly positioned steerable road wheels, at least a first and a second rearwardly positioned wheel, which are arranged on opposite sides of the vehicle and are coupled to a first and a second electric motor, respectively, which is designed to apply driving and braking torque to the corresponding wheel, wherein the first and the second electric motor are independently controllable, at least one angle sensor which is configured to provide an output that indicates a steering angle of the steerable road wheels, at least one speed sensor which is configured to provide an output that indicates the vehicle longitudinal speed, a vehicle yaw rate sensor which is configured to provide an output that indicates the measured yaw rate of the vehicle, control means that are designed for the following: to determine a target yaw rate from the road wheel steering angle and/or the vehicle longitudinal speed, to determine a yaw rate deviation by comparing at least the measured yaw rate of the vehicle with the target yaw rate, and to determine an amount of yaw torque that is necessary in order to correct or reduce the yaw rate deviation, and to control the first and the second electric motor in order to apply an amount of differential torque to the respective first and second rearwardly positioned wheels such that the amount of yaw torque is generated, wherein the vehicle is configured to provide the electrical energy that is necessary in order to apply the driving torque of the differential torque to one of the motors by recovering energy from the other of the motors that provides a braking torque.

Furthermore, DE102016217465A1 discloses a method for controlling a motor vehicle having a brake system with driving stability control, in which an, in particular measured, actual yaw rate is compared with a target yaw rate that is calculated by way of a model. Provision is also made therein that, during the calculation of the target yaw rate for the driving stability control, a yaw torque of an assistance closed-loop or open-loop control of an assistance system for lane guidance or lane keeping or lateral control is taken into account.

Again, US2019217854A1 discloses a method for controlling driving stability, comprising: determining, by a controller, whether a vehicle is turning on a downwardly sloping road; if the vehicle is determined to be bending on the downwardly sloping road, determining, by the controller, a basic target yaw rate according to a steering angle and a vehicle speed and determining a corrected target yaw rate by correcting the determined basic target yaw rate; determining, by the controller, a target yaw torque on the basis of an error between an actual yaw rate of the vehicle and the corrected target yaw rate; determining a correction value of a front wheel steering angle and a control amount of a biased braking torque according to the target yaw torque by the controller; performing a front wheel steering correction by a front wheel steering angle correction device according to the determined correction value of the front wheel steering angle and performing braking control on an outer steering wheel of the vehicle according to the determined control amount of the biased braking torque. Although already viable devices and methods for improving the driving stability of vehicles have already been disclosed here, there is nevertheless a need for improvement.

Further vehicles and controllers are disclosed for example by DE 103 60 404 A1, US 2013/253770 A1, DE 100 39 782 A1, U.S. Pat. No. 5,642,281 A, and US 2015/336607 A1.

According to the prior art, strategies for rear wheel steering (RWS) appear to be based simply on forward control, in which, proceeding from the measured steering wheel angle/front wheel angle and the vehicle speed, the steering angle at the rear wheels is defined on the basis of these inputs. This results in a highly simplified strategy, which is not really capable of controlling the yaw rate (which is closely linked to the stability of the vehicle).

Thus, a need exists to propose an improved vehicle having advantageous driving stability.

Since the driving stability device, in particular the controller, is designed to synchronize the front wheel steering and the rear wheel steering in such a way that the two systems are involved independently of one another in controlling the driving stability, and also since the driving stability device, in particular the controller, is designed:

- to calculate the target yaw rate from the vehicle speed and steering wheel angle, and to calculate the side slip angle from the vehicle speed and the steering wheel angle;
- to calculate the difference between the actual yaw rate and the target yaw rate, resulting in the definition of a target yaw rate error;
- to calculate the desired overall steering angle from the target yaw rate error;
- to distribute the angle between the front and rear axle, either
- such that only the steering angle of the front wheels is corrected (correction steering angle for the front wheels),
- such that only the steering angle of the rear wheels is corrected (correction steering angle for the rear wheels), or
- such that both the front steering angle and the rear steering angle are changed (correction steering angle for the front wheels, correction steering angle for the rear wheels), An improved vehicle with improved driving stability is provided by the instant disclosure.

In other words, the disclosure relates in particular to the combined use of front wheel steering (FWS) and rear wheel steering (RWS) in order to control the stability of the vehicle. In particular, a strategy for synchronizing the use of front wheel steering and rear wheel steering in vehicle stabilization is proposed.

Further advantageous embodiments of the proposed disclosure can be found in particular in the features of the dependent claims. The subject matter or features of the various claims can, in principle, be combined with one another as desired.

In one advantageous embodiment of the disclosure, provision may be made for the controller to be designed to control the yaw rate and the side slip angle of the vehicle, wherein the controller comprises a cascade controller which separates the control of the yaw rate and the control of the side slip angle without influencing one another. In other words, the controller is designed to decouple the yaw control and the control of the side slip angle.

In a further advantageous embodiment of the disclosure, provision may be made for the vehicle to comprise a sensor for determining the steering angle of the front wheels and a sensor for determining the steering angle of the rear wheels, wherein the controller is designed to calculate an overall steering angle that results from the difference between the steering angle of the front wheels and the steering angle of the rear wheels, in particular from the difference of the tangent between the steering angle of the front wheels and the steering angle of the rear wheels.

In a further advantageous embodiment of the disclosure, provision may be made for the controller to be designed to execute the control of the yaw rate mainly in dependence, preferably in dependence, on an overall steering angle.

In a further advantageous embodiment of the disclosure, provision may be made for the controller to be designed to execute the control of the side slip angle mainly in dependence, preferably in dependence, on the distribution of the front and rear overall steering angle.

In a further advantageous embodiment of the disclosure, provision may be made for the vehicle to be equipped with a sensor for sensing the vehicle speed and a sensor for sensing the steering wheel angle, wherein the controller is designed to calculate a target yaw rate from the vehicle speed and steering wheel angle.

In a further advantageous embodiment of the disclosure, provision may be made for the vehicle to be equipped with a sensor for sensing the vehicle speed and a sensor for sensing the steering wheel angle, wherein the controller is designed to calculate a side slip angle from the vehicle speed and the steering wheel angle.

In a further advantageous embodiment of the disclosure, provision may be made for the vehicle to be equipped with a sensor for sensing the yaw rate, wherein the controller is designed to calculate a target yaw rate error that results from the difference between the actual yaw rate and a target yaw rate.

In a further advantageous embodiment of the disclosure, provision may be made for the controller to be designed to calculate a desired overall steering angle from the target yaw rate error. To this end, use may be made, for example, of a PI controller.

In a further advantageous embodiment of the disclosure, provision may be made for the controller to be designed to correct the steering angle of the front wheels, wherein the correction angle for the front wheels corresponds to the desired overall steering angle, or for the controller to be designed to correct the steering angle of the front wheels by changing the target side slip angle.

This results in an SSA-SSC (steer stability assist-steer stability control), as for example in steer-by-wire systems according to the prior art, but with the actual RWS angle being taken into consideration on the vehicle.

In a further advantageous embodiment of the disclosure, provision may be made for the controller to be designed to correct the steering angle of the rear wheels, wherein the correction angle for the rear wheels corresponds to the negative desired overall steering angle.

This results in an SSA-SSC that controls only the rear wheel steering. The main advantage is that the driver has the feeling that the front is always connected to the steering wheel, such that the driver does not perceive any instability in the steering feel.

In a further advantageous embodiment of the disclosure, provision may be made for the controller to be designed to change both the steering angle of the front wheels and the steering angle of the rear wheels.

As a result, the steering angle of the front wheels and the steering angle of the rear wheels can be distributed in proportion with the imposed generalized delta (k parameter).

This value can also be checked and changed in order to follow a target. Preferably, in this case, an estimation of the front or rear tyre slip angle is helpful, either with a linear or non-linear controller (g).

A further object of the present disclosure is to propose an advantageous method for improving driving stability of a vehicle.

In one step, in particular a first step, the target yaw rate is calculated from the vehicle speed and steering wheel angle, and the side slip angle is calculated from the vehicle speed and the steering wheel angle. In this regard, reference may be made in particular to the graphs according to FIGS. 2*a* and 2*b*.

In a further step, in particular a second step, the difference between the actual yaw rate and the target yaw rate is calculated, resulting in the definition of a target yaw rate error.

In a further step, in particular a third step, the desired overall steering angle is calculated from the target yaw rate error.

In a further step, in particular a fourth step, the angle is distributed between the front and rear axle, either

- such that only the steering angle of the front wheels is corrected,
- such that only the steering angle of the rear wheels is corrected, or
- such that both the front steering angle and the rear steering angle are changed.

Thus, the front and the rear steering angle can be distributed in proportion with the imposed generalized delta (k parameter). This value can also be checked and changed in order to follow a target (in this case, an estimation of the front or rear tyre slip angle is necessary), either with a linear or non-linear controller (g).

BRIEF DESCRIPTION OF THE FIGURES

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION

Figure 1:
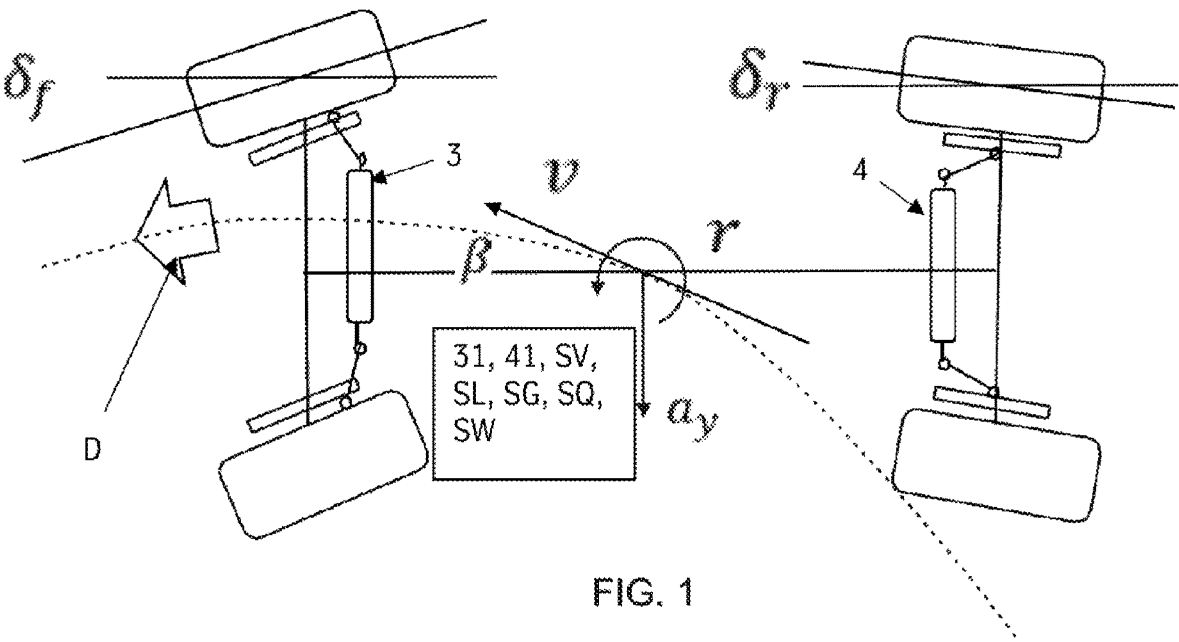
FIG. 1 shows a schematic illustration of a vehicle according to the disclosure.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The following reference signs are used in the drawings:

D Direction of movement of the vehicle
SV Vehicle speed sensor
SL Steering wheel angle sensor
SG Yaw rate sensor
SQ Lateral acceleration sensor
SW Side slip angle sensor
E1 Input for the vehicle speed v
E2 Input for the yaw rate $\gamma$
E3 Input for the lateral acceleration $a_y$,
E4 Input for the steering wheel angle $\delta_{steering}$,
E5 Input for the side slip angle $\beta$,
E6 Input for the measured steering angle $\delta_f$ of the front wheels
E7 Input for the measured steering angle $\delta_r$ of the rear wheels.
A1 Output for a correction steering angle $\Delta\delta_f$ for the front wheels
A2 Output for a correction steering angle $\Delta\delta_r$ for the rear wheels
1*a* Front wheel
1*b* Front wheel
2*a* Rear wheel
2*b* Rear wheel
3 Front wheel steering
4 Rear wheel steering
5 Controller
31 Steering angle sensor (front wheels)
41 Steering angle sensor (rear wheels)
$\delta_f$ Steering angle of the front wheels
$\delta_r$ Steering angle of the rear wheels
$\Delta\delta_f$ Correction steering angle for the front wheels
$\Delta\delta_r$ Correction steering angle for the rear wheels
$\delta_g$ Overall steering angle
$\Delta\delta_g$ Overall wheel angle
$\delta_{steering}$ Steering wheel angle
$\beta$ Side slip angle
v Vehicle speed
$\gamma$ Yaw rate
$\gamma_{meas}$ Actual yaw rate
$\gamma_{target}$ Target yaw rate
$a_y$ Lateral acceleration
$\beta_{target}$ Target side slip angle
$e\gamma$ Target yaw rate error Here, features and details that are described in conjunction with a method also apply, of course, in conjunction with the device according to the disclosure, and vice versa, and so, with regard to the disclosure of the individual aspects of the disclosure, reciprocal reference is always or can always be made. Furthermore, a possibly described method according to the disclosure can be carried out with the device according to the disclosure.

The terminology used herein serves the purpose only of describing particular embodiments and is not intended to restrict the disclosure. As used herein, the singular forms "a/an" and singular "the" are also intended to include the plural forms, unless the context makes it clear that this is not the case. It will also be clear that the expressions "has" and/or "having", where used in this description, specify the presence of the stated features, whole numbers, steps, operations, elements and/or components, but does not exclude the presence or the addition of one or more other features, whole numbers, steps, operations, elements, components and/or groups thereof. As used herein, the expression "and/or" includes any desired one of and all combinations of one or more of the associated, listed elements.

First of all, reference is made to FIG. 1.

A vehicle, in particular motor vehicle, according to the disclosure comprises essentially two front wheels 1*a*, 1*b* on which front wheel steering 3 can act in order to set the steering angle $\delta_f$ of the front wheels, and two rear wheels 2*a*, 2*b* on which rear wheel steering 4 can act in order to set the steering angle $\delta_r$ of the rear wheels. Both the front wheel steering and the rear wheel steering may be systems which can be controlled by a human user of the vehicle, in this case via a steering wheel (not illustrated) and/or via an autonomous vehicle controller. The steering wheel (not illustrated) may adopt a steering wheel angle $\delta_{steering}$.

Moreover, the vehicle parameters of vehicle speed v, yaw rate $\gamma$, side slip angle $\beta$ and lateral acceleration $a_y$ are indicated by corresponding arrows in the schematic illustration according to FIG. 1. A dot-dashed line with the arrow D is intended to indicate the direction of movement of the vehicle.

Figure 2A:
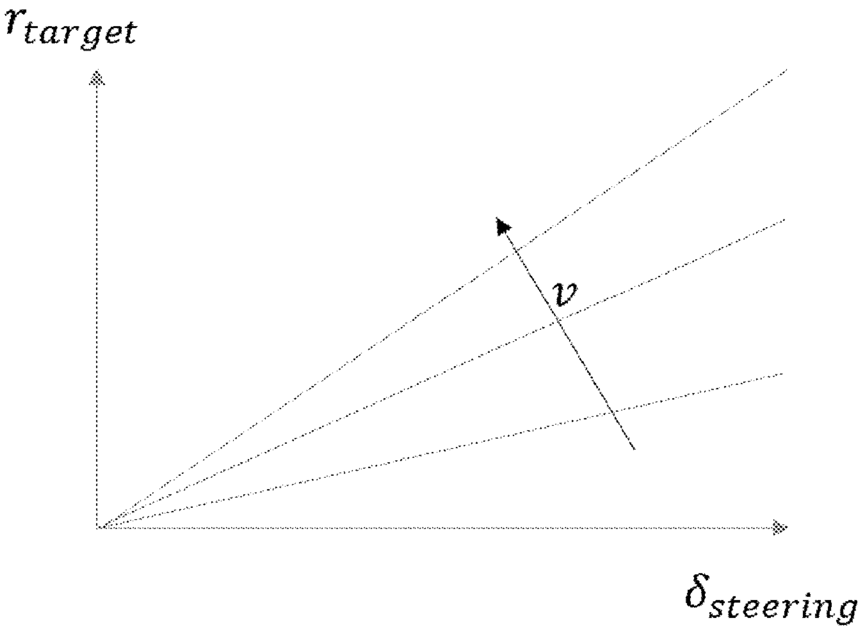
FIG. 2*a* shows a function graph for illustrating, by way of example, the calculation of the target yaw rate from the vehicle speed and steering wheel angle.

FIG. 2*a* illustrates a function graph for illustrating, by way of example, the calculation of a target yaw rate $\gamma_{target}$ from the vehicle speed v and steering wheel angle $\delta_{steering}$.

Figure 2B:
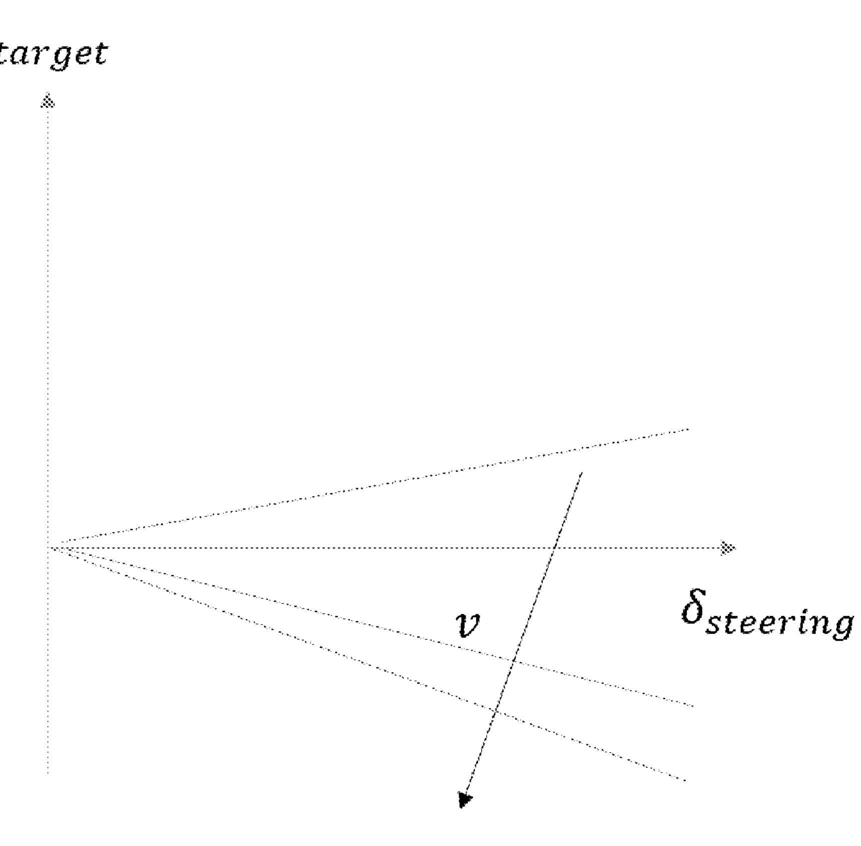
FIG. 2*b* shows a function graph for illustrating, by way of example, the calculation of the target side slip angle from the vehicle speed and steering wheel angle.

FIG. 2*b* illustrates a function graph for illustrating, by way of example, the calculation of a target side slip angle $\beta_{target}$ from the vehicle speed v and steering wheel angle $\delta_{steering}$.

Figure 3:
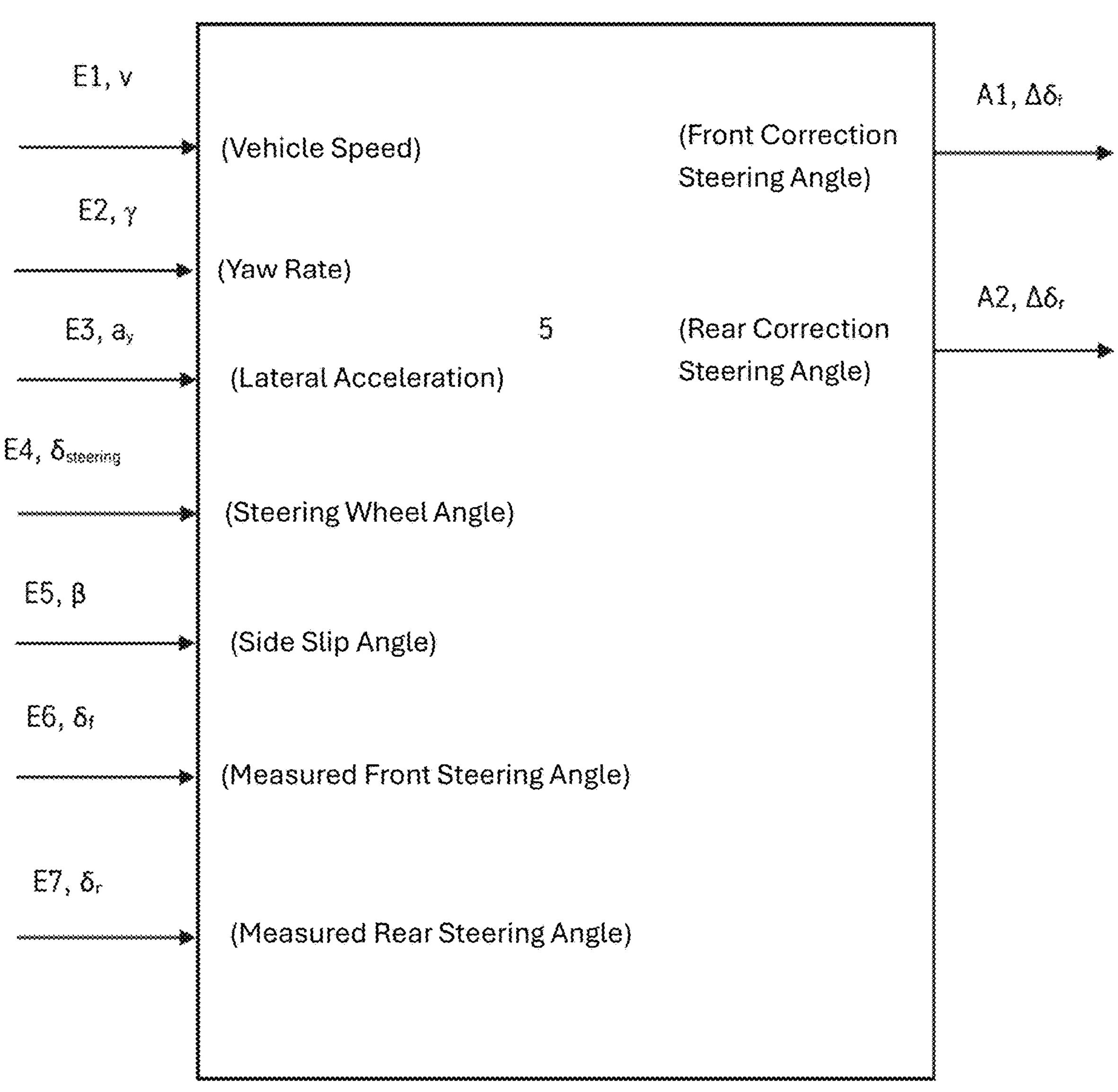
FIG. 3 shows a schematic illustration of a controller of a driving stability device of a vehicle according to the disclosure.

FIG. 3 illustrates a schematic illustration of a controller 5 of a driving stability device of a vehicle according to the disclosure.

The controller 5 is in principle an electronic control unit, which is designed to process data.

The controller 5 comprises an input E1 for the vehicle speed v, an input E2 for the yaw rate $\gamma$, an input E3 for the lateral acceleration $a_y$, an input E4 for the steering wheel angle $\delta_{steering}$, an input E5 for the side slip angle $\beta$, an input E6 for the measured steering angle $\delta_f$ of the front wheels, and an input E7 for the measured steering angle $\delta_r$ of the rear wheels.

The inputs are established in accordance with the evaluation of analogue measured values and/or digital data.

The vehicle, in particular the driving stability device, is equipped in principle with the necessary sensors for sensing the input values outlined above, in particular a sensor SV for sensing the vehicle speed v, a sensor SG for sensing the yaw rate $\gamma$, a sensor SQ for sensing the lateral acceleration $a_y$, a sensor SL for the steering wheel angle $\delta_{steering}$, a sensor SW for the side slip angle $\beta$, a sensor 31 for the steering angle $\delta_f$ of the front wheels 1*a*, 1*b*, and a sensor 41 for the steering angle $\delta_r$ of the rear wheels 2*a*, 2*b*.

Furthermore, the controller 5 comprises an output A1 for a correction steering angle $\Delta\delta_f$ for the front wheels, and an output A2 for a correction steering angle $\Delta\delta_r$ for the rear wheels. The outputs are connected to corresponding actuators or can act on the corresponding actuators.

According to the disclosure, provision is made for the vehicle, in particular the driving stability device, in particular the controller 5, to be designed to synchronize the front wheel steering 3 and the rear wheel steering 4 in such a way that the two systems are involved independently of one another in controlling the driving stability. As a result, an improved vehicle with advantageous driving stability can be provided.

In other words, the disclosure relates in particular to the combined use of front wheel steering 3 and rear wheel steering 4 to control the stability of the vehicle. In particular, a strategy for synchronizing the use of front wheel steering 3 and rear wheel steering 4 in vehicle stabilization is proposed.

In this regard, the controller 5 is designed in particular to control the yaw rate $\gamma$ and the side slip angle $\beta$ of the vehicle, wherein the controller 5 comprises in particular a cascade controller which separates the control of the yaw rate $\gamma$ and the control of the side slip angle $\beta$ from one another without influencing one another. In other words, the controller 5 is designed to decouple the yaw control and the control of the side slip angle.

Provision is preferably made for the vehicle to comprise a sensor 31 for determining the steering angle $\delta_f$ of the front wheels 1$a$, 1$b$ and a sensor 41 for determining the steering angle $\delta_r$ of the rear wheels 2$a$, 2$b$, wherein the controller 5 is designed to calculate an overall steering angle $\Delta\delta_g$ that results from the difference between the steering angle $\delta_f$ of the front wheels 1$a$, 1$b$ and the steering angle $\delta_r$ of the rear wheels 2$a$, 2$b$, in particular from the difference of the tangent between the steering angle $\delta_f$ of the front wheels 1$a$, 1$b$ and the steering angle $\delta_r$ of the rear wheels 2$a$, 2$b$.

Provision is preferably made for the controller 5 to be designed to execute the control of the yaw rate $\gamma$ mainly in dependence, preferably in dependence, on the overall steering angle $\Delta\delta_g$.

Provision is preferably made for the controller 5 to be designed to execute the control of the side slip angle $\beta$ mainly in dependence, preferably in dependence, on the distribution of the front and rear overall steering angle.

Provision is preferably made for the controller 5 to be designed to calculate a target yaw rate $\gamma_{target}$ from the vehicle speed v and steering wheel angle $\delta_{steering}$.

Provision is preferably made for the controller 5 to be designed to calculate the side slip angle $\beta$ from the vehicle speed v and the steering wheel angle $\delta_{steering}$.

Provision is preferably made for the controller 5 to be designed to calculate a target yaw rate error $e\gamma$ that results from the difference between the actual yaw rate $\gamma_{meas}$ and a target yaw rate $\gamma_{target}$.

Provision is preferably made for the controller 5 to be designed to calculate a desired overall steering angle $\Delta\delta_g$ from the target yaw rate error $e\gamma$.

Provision is preferably made for the controller 5 to be designed to change the front wheel steering angle $\delta_f$, wherein the correction steering angle for the front wheels $\Delta\delta_f$ corresponds to the desired overall steering angle $\Delta\delta_g$. Provision may furthermore preferably be made for the controller 5 to be designed to correct the steering angle $\delta_f$ of the front wheels 1$a$, 1$b$ by changing the target side slip angle $\beta_{target}$.

This results in an SSA-SSC (steer stability assist-steer stability control), as for example in steer-by-wire systems according to the prior art, but with the actual steering angle $\delta_r$ of the rear wheels 2$a$, 2$b$ being taken into consideration on the vehicle.

Provision is preferably made for the controller 5 to be designed to change the rear wheel steering angle $\delta_r$, wherein the corrected rear wheel steering angle $\Delta\delta_f$ corresponds to the negative desired overall steering angle $\Delta\delta_g$. Provision may furthermore preferably be made for the controller 5 to be designed to correct the steering angle $\delta_r$ of the rear wheels 2$a$, 2$b$ by changing the target side slip angle $\beta_{target}$.

This results in an SSA-SSC that controls only the rear wheel steering. The main advantage is that the driver has the feeling that the front, in particular the front wheel steering 3, is always connected to the steering wheel, such that the driver does not perceive any instability in the steering feel.

Provision is preferably made for the controller 5 to be designed to change both the steering angle $\delta_f$ of the front wheels 1$a$, 1$b$ and the steering angle $\delta_r$ of the rear wheels 2$a$, 2$b$.

As a result, the steering angle $\delta_f$ of the front wheels 1$a$, 1$b$ and the steering angle $\delta_r$ of the rear wheels 2$a$, 2$b$ can be distributed in proportion with the imposed generalized delta (k parameter). This value can also be checked and changed in order to follow a target. Preferably, in this case, an estimation of the front or rear tyre slip angle is helpful, either with a linear or non-linear controller (g).

The method according to the disclosure that is preferably able to be carried out with the vehicle, in particular the driving stability device, in particular the controller, is characterized in particular by the method steps set out in the following text. It goes without saying that only a few selected method steps are illustrated here, as are helpful to the understanding of the method according to the disclosure. The disclosure may comprise further steps, or intermediate steps, that are known to a person skilled in the art.

In a first step, the target yaw rate $\gamma_{target}$ is calculated from the vehicle speed v and steering wheel angle $\delta_{steering}$, and the side slip angle $\beta$ is calculated from the vehicle speed v and the steering wheel angle $\delta_{steering}$. In this case, reference may be made to the example graphs in FIGS. 2$a$ and 2$b$.

In a further step, in particular a second step, the difference between the actual yaw rate $\gamma_{meas}$ and the target yaw rate $\gamma_{target}$ is calculated, resulting in the definition of a target yaw rate error $e\gamma$.

In a further step, in particular a third step, the desired overall steering angle $\Delta\delta_g$ is calculated from the target yaw rate error $e\gamma$.

In a further step, in particular a fourth step, the angle is distributed between the front and rear axle, either

- such that only the front wheel steering angle $\delta_f$ is changed, wherein the correction steering angle for the front wheels $\Delta\delta_f$ corresponds to the desired overall steering angle $\Delta\delta_g$,
- such that only the rear wheel steering angle $\delta_r$ is changed, wherein the corrected rear wheel steering angle $\Delta\delta_f$ corresponds to the negative desired overall steering angle $\Delta\delta_g$, and/or
- such that both the front wheel steering angle and the rear wheel steering angle are changed.

As a result, the steering angle $\delta_f$ of the front wheels 1$a$, 1$b$ and the steering angle $\delta_r$ of the rear wheels 2$a$, 2$b$ can be distributed in proportion with the imposed generalized delta (k parameter). This value can also be checked and changed in order to follow a target. Preferably, in this case, an estimation of the front or rear tyre slip angle is helpful, either with a linear or non-linear controller (g).

What is claimed is:

1. A motor vehicle, comprising:

two front wheels with front wheel steering, two rear wheels with rear wheel steering, and a driving stability device with a controller, wherein the controller of the driving stability device is configured to synchronize the front wheel steering and the rear wheel steering in such a way that the front wheel steering and rear wheel steering are involved independently of one another in controlling the driving stability, wherein the controller of the driving stability device, is further configured to:

calculate a target yaw rate ($\gamma_{target}$) from a vehicle speed (v) and a steering wheel angle ($\delta_{steering}$), and to calculate a side slip angle ($\beta$) from the vehicle speed (v) and the steering wheel angle ($\delta_{steering}$);

calculate a difference between an actual yaw rate ($\gamma_{meas}$) and a target yaw rate ($\gamma_{target}$), resulting in a definition of a target yaw rate error (e$\gamma$);

calculate a desired overall steering angle ($\Delta\delta_g$) from the target yaw rate error (e$\gamma$); and distribute the angle between the front and rear axle, by one of:

only the steering angle of the front wheels is corrected (correction steering angle ($\Delta\delta_f$) for the front wheels);

only the steering angle of the rear wheels is corrected (correction steering angle ($\Delta\delta_r$) for the rear wheels); and both the front steering angle and the rear steering angle are changed (correction steering angle ($\Delta\delta_f$) for the front wheels, correction steering angle ($\Delta\delta_r$) for the rear wheels);

wherein the controller is configured to control a yaw rate ($\gamma$) and the side slip angle ($\beta$) of the vehicle, wherein the controller comprises a cascade controller which separates the control of the yaw rate ($\gamma$) and the control of the side slip angle ($\beta$) from one another without influencing one another.

2. The vehicle according to claim 1 wherein the vehicle comprises a first sensor for determining the steering angle ($\delta_f$) of the front wheels and a second sensor for determining the steering angle ($\delta_r$) of the rear wheels, wherein the controller is configured to calculate an overall wheel angle ($\delta_g$) that results from the difference between the steering angle ($\delta_f$) of the front wheels and the steering angle ($\delta_r$) of the rear wheels, from the difference of the tangent between the steering angle ($\delta_f$) of the front wheels and the steering angle ($\delta_r$) of the rear wheels.

3. The vehicle according to claim 1 wherein the controller is configured to execute the control of the yaw rate ($\gamma$) in dependence, on an overall steering angle ($\Delta\delta_g$).

4. The vehicle according to claim 1 wherein the driving stability device is equipped with a third sensor for sensing the vehicle speed (v) and a fourth sensor for sensing the steering wheel angle ($\delta_{steering}$), wherein the controller calculates a target yaw rate ($\delta_{target}$) from the vehicle speed (v) and steering wheel angle ($\delta_{steering}$).

5. The vehicle according to claim 1 wherein the driving stability device, is equipped with a third sensor for sensing the vehicle speed (v) and a fourth sensor for sensing the steering wheel angle ($\delta_{steering}$), wherein the controller is configured to calculate a side slip angle ($\beta$) from the vehicle speed (v) and the steering wheel angle ($\delta_{steering}$).

6. The vehicle according to claim 1 wherein the driving stability device is equipped with a fifth sensor for sensing the yaw rate ($\gamma$), wherein the controller is configured to calculate a target yaw rate error (e$\gamma$) that results from the difference between the actual yaw rate ($\gamma_{meas}$) and a target yaw rate ($\gamma_{target}$).

7. The vehicle according to claim 1 wherein the controller is configured to calculate a desired overall steering angle ($\Delta\delta_g$) from the target yaw rate error (e$\gamma$).

8. The vehicle according to claim 1 wherein the controller is configured to (i) correct the steering angle ($\delta_f$) of the front wheels, wherein the correction steering angle ($\Delta\delta_f$) for the front wheels corresponds to the desired overall steering angle ($\Delta\delta_g$), or (ii) correct the steering angle ($\delta_f$) of the front wheels by changing the target side slip angle ($\beta_{target}$).

9. The vehicle according to claim 1 wherein the controller is configured to (i) correct the steering angle ($\delta_r$) of the rear wheels, wherein the correction steering angle ($\Delta\delta_r$) for the rear wheels (2*a*, 2*b*) corresponds to the negative desired overall steering angle ($\Delta\delta_g$), or (ii) correct the steering angle ($\delta_r$) of the rear wheels by changing the target side slip angle ($\beta_{target}$).

10. The vehicle according to claim 1 wherein the controller is configured to correct ($\Delta\delta_f$, $\Delta\delta_r$) both the steering angle ($\delta_f$) of the front wheels and the steering angle ($\delta_r$) of the rear wheels.

11. A method for operating a vehicle according to claim 1 comprising the following method steps:

calculating the target yaw rate ($\gamma_{target}$) from the vehicle speed (v) and steering wheel angle ($\delta_{steering}$), and calculating the side slip angle ($\beta$) from the vehicle speed (v) and the steering wheel angle ($\delta_{steering}$);

calculating the difference between the actual yaw rate ($\gamma_{meas}$) and the target yaw rate ($\gamma_{target}$), resulting in the definition of a target yaw rate error (e$\gamma$);

calculating the desired overall steering angle ($\Delta\delta_g$) from the target yaw rate error (e$\gamma$);

distributing the angle between the front and rear axle in such a way that control of the yaw rate ($\gamma$) is decoupled from control of the side slip angle ($\beta$), by one of:

only the steering angle of the front wheels is corrected (correction steering angle ($\Delta\delta_f$) for the front wheels), only the steering angle of the rear wheels is corrected (correction steering angle ($\Delta\delta_r$) for the rear wheels), or both the front steering angle and the rear steering angle are changed (correction steering angle ($\Delta\delta_f$) for the front wheels (1*a*, 1*b*), correction steering angle ($\Delta\delta_r$) for the rear wheels).

12. A motor vehicle, comprising:

two front wheels with front wheel steering, two rear wheels with rear wheel steering, and a driving stability device with a controller, wherein the controller of the driving stability device is configured to synchronize the front wheel steering and the rear wheel steering in such a way that the front wheel steering and rear wheel steering are involved independently of one another in controlling the driving stability, wherein the controller of the driving stability device, is further configured to:

calculate a target yaw rate ($\gamma_{target}$) from a vehicle speed (v) and a steering wheel angle ($\delta_{steering}$), and to calculate a side slip angle ($\beta$) from the vehicle speed (v) and the steering wheel angle ($\delta_{steering}$);

calculate a difference between an actual yaw rate ($\gamma_{meas}$) and a target yaw rate ($\gamma_{target}$), resulting in a definition of a target yaw rate error (e$\gamma$);

calculate a desired overall steering angle ($\Delta\delta_g$) from the target yaw rate error (eγ);

distribute the angle to the front axle, by correcting only the steering angle of the front wheels;

distribute the angle to the rear axle, by correcting only the steering angle of the rear wheels, wherein correcting the steering angle of the rear wheels includes either ensuring that a correction steering angle for the rear wheels (Δδr) corresponds to a negative of the desired overall steering angle (Δδg), or changing a target side slip angle (βtarget); and distribute the angle between the front and rear axle, by correcting both the front steering angle and the rear steering angle, wherein correcting the rear steering angle includes either ensuring that a correction steering angle for the rear wheels (Δδr) corresponds to a negative of the desired overall steering angle (Δδg), or changing a target side slip angle (βtarget).

* * * * *